United States Patent
Knaup et al.

(10) Patent No.: US 9,071,168 B2
(45) Date of Patent: Jun. 30, 2015

(54) POWER INVERTER CIRCUIT FOR ADJUSTING SYMMETRY OF THE AC-VOLTAGE WITHOUT LOAD-COUPLING

(75) Inventors: Peter Knaup, Zwingenberg/Bergstrasse (DE); Karl Koch, Mömbris (DE); Thomas Lenz, Bad Homburg (DE)

(73) Assignee: voltwerk electronics GmbH, Hamburg (DE)

( * ) Notice: Subject to any disclaimer, the term of this patent is extended or adjusted under 35 U.S.C. 154(b) by 1412 days.

(21) Appl. No.: 12/442,660

(22) PCT Filed: Sep. 25, 2006

(86) PCT No.: PCT/EP2006/009269
§ 371 (c)(1),
(2), (4) Date: Jun. 19, 2009

(87) PCT Pub. No.: WO2008/049441
PCT Pub. Date: May 2, 2008

(65) Prior Publication Data
US 2009/0316448 A1 Dec. 24, 2009

(51) Int. Cl.
*H02M 7/537* (2006.01)
*H02M 7/538* (2007.01)
(Continued)

(52) U.S. Cl.
CPC .. *H02M 7/53803* (2013.01); *H02M 2007/4803* (2013.01)

(58) Field of Classification Search
USPC ............. 363/34–35, 40–41, 56.01–56.12, 57, 363/71, 80, 95–98, 109, 55–56.02, 363/131–132, 65; 327/391, 423–424, 433, 327/437
See application file for complete search history.

(56) References Cited

U.S. PATENT DOCUMENTS 5,615,100 A * 3/1997 Radecker et al. ............... 363/97
5,953,220 A 9/1999 Tsai et al.
(Continued)

FOREIGN PATENT DOCUMENTS

DE 197 32 218 C1 3/1999
DE 10 2004 037 466 A1 6/2006
JP 2003-018846 A 1/2003

OTHER PUBLICATIONS

Search/Examination Report dated Aug. 1, 2011 from European Patent Application No. 06805829.6, 3 pages.
(Continued)

*Primary Examiner* — Adolf Berhane
*Assistant Examiner* — Henry Lee, III
(74) *Attorney, Agent, or Firm* — Kilpatrick Townsend & Stockton LLP

(57) ABSTRACT

The invention relates to a power inverter circuit for coupling a power station to a power supply system. The invention addresses the problem to reduce the risk of damages to components of the power station and the power supply system in the course of coupling action by providing a power inverter circuit for adjusting symmetry of the AC voltage before coupling the inverter output to a load, comprising: first switching means for selectively connecting a positive voltage to the inverter circuit output, second switching means for selectively connecting a negative voltage to the inverter output, and ohmic resistance means coupled in parallel to the inverter output, a controller for selectively switching the first and second switching means with a switching frequency to produce an AC voltage from the positive and negative voltage, wherein the controller is adapted to alter the duty ratio of the switching frequency to adjust the symmetry of the AC voltage produced by the inverter.

14 Claims, 1 Drawing Sheet

(51) Int. Cl.
*H02M 1/00* (2006.01)
*H02H 7/122* (2006.01)
*H02M 7/48* (2007.01)

(56) References Cited

U.S. PATENT DOCUMENTS 6,314,007 B2 * 11/2001 Johnson et al. ................. 363/37
6,838,925 B1 * 1/2005 Nielsen ......................... 327/391
7,495,935 B2 * 2/2009 Chen et al. ................. 363/21.12
2004/0164557 A1 8/2004 West
2004/0165408 A1 8/2004 West et al.
2005/0219883 A1 10/2005 Maple et al.

OTHER PUBLICATIONS

Communication from the European Patent Office, dated May 6, 2010, pp. 1-4.

* cited by examiner

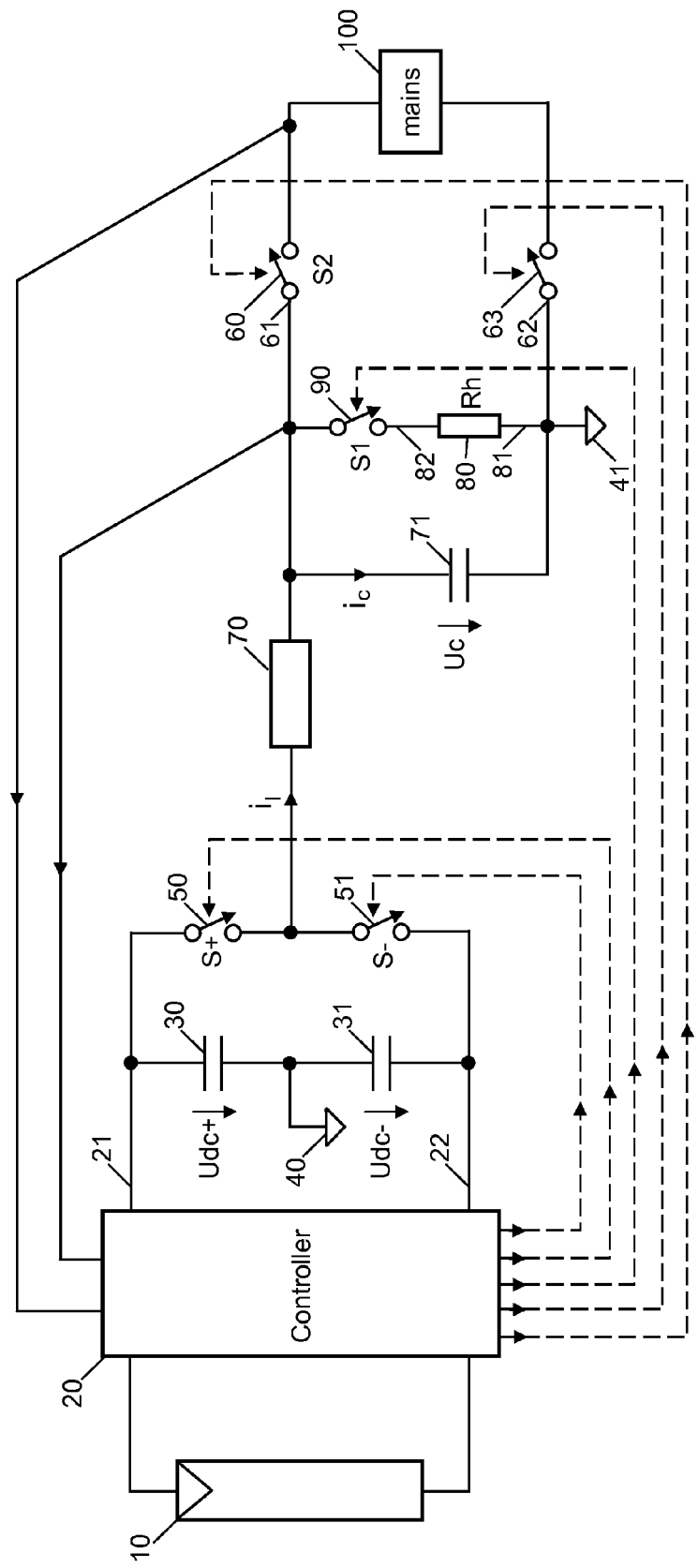

POWER INVERTER CIRCUIT FOR ADJUSTING SYMMETRY OF THE AC-VOLTAGE WITHOUT LOAD-COUPLING

CROSS-REFERENCES TO RELATED APPLICATIONS

This application is the U.S. National Stage entry of International Application No. PCT/EP2006/009269, filed Sep. 25, 2006, which is incorporated herein by reference in its entirety for all purposes

BACKGROUND OF THE INVENTION

The invention relates to a power inverter circuit for adjusting symmetry of the AC voltage before coupling the inverter circuit output to a load.

The invention further relates to a method for adjusting output-voltage of an inverter to the mains voltage or the load voltage circuit before coupling the inverter circuit output to a load.

Inverter circuits are used for a variety of applications. E.g., a constantly growing field of use for inverter circuits is the transformation of a DC-voltage provided by a photovoltaic device into an AC-voltage which can be used to supply electric consumer products. In most of such applications, the AC-voltage is supplied to a power supply system which spreads over a large region, e.g. nationwide or even across the boarders of a plurality of states. In such case, the AC-voltage supplied to the power supply system has to be adapted to the voltage in the power supply system. In particular, it is required to synchronize the inverter output voltage with the power supply system voltage and to adjust the symmetry of the inverter output voltage to the power supply system voltage.

BRIEF SUMMARY OF THE INVENTION

The term "symmetry" in the sense of this description and the accompanying claims is used to describe the amount of positive voltage in relation to the negative voltage of the AC voltage. Usually, inverters comprise a DC-link and adjusting the symmetry of the AC output voltage can be achieved by adjusting symmetry of this DC link. In the following, the terms "adjusting symmetry of the AC-voltage" and "adjusting symmetry of the DC-link" are used to have the same technical effect and meaning, although electrical circuits for adjusting the symmetry of the AC output voltage might be realised which make use of the invention without adjusting symmetry of the DC link. The term "adjusting the symmetry" is used herein to describe the process of changing the relation of positive to negative voltage of one specific voltage (e.g. the inverter output voltage) to correspond to another voltage (e.g. the power supply system voltage). Usually, the aim of adjusting the symmetry is to provide an amount of positive voltage which is identical to the amount of negative voltage, i.e. the sinusoidal AC-voltage oscillates with an average voltage of 0V. When adjusting the symmetry of the DC-link, this will usually result in equal amounts of positive and negative charge voltage versus ground of the capacitors forming the DC-link.

Usually, half-bridge topologies are used to reduce forward losses, switching losses and costs of the inverter circuit. Such half-bridge topologies provide the afore-mentioned positive and negative voltage versus ground and it is state of the art to adjust symmetry of these positive and negative voltages during operation of the inverter and flow of current into the load, i.e. with the inverter coupled to the load, namely the power supply system by extracting or injecting a direct current from/into the power supply system. However, depending on the magnitude of the voltage and current supplied by the inverter to the power supply system and the sensitivity of the inverter and the power supply system, this process of adjusting symmetry and synchronizing the voltages during operation may produce serious disturbance or even damage to the power supply system and/or the inverter circuit while switching from decoupled to coupled operation mode.

It is the aim of the invention to minimize and preferably avoid the risk of such deterioration and damages.

This object is solved by a Power inverter circuit for adjusting symmetry of the DC-link before coupling the inverter output to a load, comprising first switching means for selectively connecting a positive voltage to the inverter circuit output, second switching means for selectively connecting a negative voltage to the inverter output, ohmic resistance means coupled in parallel to the inverter output and a controller for selectively switching the first and second switching means with a switching frequency to produce an AC voltage from the positive and negative voltage, wherein the controller is adapted to vary the frequency and/or the phase of the switching frequency to adjust the symmetry of the AC voltage produced by the inverter.

The power inverter circuit according to the invention allows the adjusting of the symmetry of the AC-voltage produced by the inverter before connecting the inverter to a load like a public power supply system. By this, the risk of damages to the inverter or disturbance of the public power supply system is significantly reduced. According to the invention, ohmic resistance means are coupled in parallel to the inverter output, i.e. usually between an inverter output terminal and ground terminal. With this ohmic resistance means coupled to the inverter output, first and second switching means, which are arranged to selectively connect a positive or a negative voltage to the inverter output, i.e. to the ohmic resistance means, can be opened and closed in such a way as to adjust the symmetry of the DC-link to comply with the symmetry in the power supply system, namely to have equal amounts of positive and negative voltage (UDC+=UDC−).

According to the invention, a controller is used which activates the first and second switching means and receives as input a signal representative for the symmetry of the AC-voltage produced by the inverter. The controller is adapted to switch the first and second switching means with a predetermined base frequency. This frequency could correspond to the desired frequency of the output voltage but it is preferred to switch the first and second switching means with a significantly higher frequency and to produce the output voltage with demodulation means.

According to the invention, the controller is adapted to alter the duty ratio, namely the relation of the on-time of the first switching means and the total on-time of first and second switching means, in order to adjust the symmetry of the output voltage. By this, the symmetry of the DC-link can be adjusted. The invention allows for precise adjustment of the symmetry before connecting the output to a load by providing ohmic resistance means coupled in parallel to the output.

According to a first preferred embodiment, the ohmic resistance means are coupled via third switching means to the inverter output. This embodiment allows for decoupling the ohmic resistance means after the adjustment of the symmetry has been finished. By this, any losses occurring by the ohmic resistance means in normal operation mode, i.e. after coupling the inverter to the power supply system, can be avoided.

Preferably, the controller is adapted to alter the frequency and/or the phase of the switching frequency to synchronize the AC voltage produced by the inverter to an AC voltage provided in a load to which the inverter output is to be connected. As a synchronization of a first frequency to a second frequency it is to be understood, that the phase of the first frequency is shifted and the frequency of the first frequency is increased or decreased in such a way, that its phase and frequency correspond to those of the second frequency.

It is further preferred, that the first and second switching means are adapted to be switched at frequencies of more than 1 kHz in particular above 15 kHz-20 kHz. This allows a quick and precise adjustment of symmetry of the DC-Link. Preferably, first and second switching means are provided using an IGBT circuit or transistors like MOSFET.

According to a further preferred embodiment, the inverter circuit according to the invention comprises fourth switching means arranged between the ohmic resistance means and the inverter output for selectively coupling the inverter to the load. These fourth switching means allow for connecting at least one, preferably both of the inverter output terminals to the load, e.g. the public power supply system after the symmetry has been adjusted and for decoupling the inverter, e.g. in case of disturbance in the public power supply system or in the inverter or in a photovoltaic system supplying the DC-current to the inverter.

Further it is preferred that the inverter has inductive-capacitive filtering means coupled between inverting means and the inverter output. These filtering means provide significant reduction of harmonic distortion of the AC-voltage which is usually required when supplying an AC-voltage to a power supply system.

The afore-mentioned preferred embodiment can be further improved in that the inductive-capacitive filtering means comprise capacitive resistance means coupled in parallel to the ohmic resistance means.

Another improvement of the inductive-capacitive filtering means is provided by a preferred embodiment wherein inductive-capacitive filtering means comprise inductive resistance means connected in series to the ohmic resistance means.

Finally, the inverter circuit according to the invention can be improved by providing a chopper controller coupled in parallel to the input of the inverter circuit. By this, the inverter input can precisely be transformed into the AC-voltage. The chopper controller acts as a boost converter for adjusting solar generator voltage to maximize solar power yield.

A further aspect of the invention is a method for adjusting the output voltage of an inverter circuit before coupling the inverter output to a load, comprising the steps of:
  coupling ohmic resistance means in parallel to the inverter output
  selectively switching first switching means for connecting a positive voltage to the inverter circuit output, and
  selectively switching second switching means for connecting a negative voltage to the inverter output
  selectively altering the duty ratio of switching the first and second switching means for adjusting symmetry of the output voltage.

The method allows for adjusting symmetry of the output voltage and synchronizing the inverter output voltage with the power supply system voltage before coupling the inverter output to a load like a public power supply system and thus reduces the stress of the switches coupling the inverter to the mains and the risk of damage to the inverter and the power supply system.

Preferably, the ohmic resistance means are decoupled from the inverter output after the symmetry has been adjusted.

Further, it is preferred that the inverter output is coupled to the load after the symmetry has been adjusted and the synchronization is finished, in particular after the ohmic resistance means have been decoupled from the inverter output.

Still further, it is preferred that the inverted AC voltage is filtered using inductive-capacitive filtering means coupled between inverting means and the inverter output.

Finally, it is preferred that the duty ratio of switching the first and second switching means is selectively altered for synchronizing the symmetry of the output voltage to a voltage in a public main system before coupling the inverter output to the load.

BRIEF DESCRIPTION OF THE DRAWINGS

A preferred embodiment of the invention is described with reference to the accompanying FIG. 1.

DETAILED DESCRIPTION OF THE INVENTION

The FIGURE shows an exemplary power inverter circuit according to the invention.

In the FIGURE, reference numeral 10 designates a photovoltaic cell or a system of a plurality of photovoltaic cells.

The photovoltaic cell or cells is/are connected to a boost converter controller 20 which is connected via a first positive connecting line 21 to a first capacitor 30 which is coupled between the first connecting line 21 and a ground terminal 40 and via a second negative connecting line 22 to a second negative capacitor 31 connecting the second negative connecting line 22 to the ground terminal 40.

A switch 50 connects the positive connecting line 21 with a power supply line 52 and a second switch 51 connects the negative connecting line 22 with the power supply line 52.

The power supply line 52 can be connected to a public power supply system 100 via a main switch 60, 63 connecting first and second power output terminals 61, 62 with corresponding connecting terminals of the public power supply system. The second connecting terminal 62 of the inverter circuit is connected to a ground terminal 41.

The power supply line 52 is connected with the power output terminals 61, 62 of the inverter circuit via inductive-capacitive filtering means comprising an inductive reactance 70 connected in series between output terminal 61 and the connection line connecting the switches 50,51 to the power connecting line 52 and a capacitor 71 connected in parallel to the output terminals 61,62.

Further, an ohmic resistance 80 is connected in parallel to the capacitor 71 and, consequently, in parallel to the output terminals 61,62 of the inverter circuit. One connecting terminal 81 of the ohmic resistance 80 is connected to the ground terminal 41. The other connecting terminal 82 of the ohmic resistance 80 is connected to a switch 90 which is arranged to couple the connecting terminal 82 to the power connecting line 52 between the inductive-capacitive filter 70,71 and the output terminal 61. Thus, the second connecting terminal 82 can be connected by the switch 90 to the output terminal 61 of the inverter circuit.

The method of adjusting the symmetry of the DC-link of the inverter shown in the FIGURE is described below with reference to the FIGURE.

In the initial situation, switches 50,51 and 60,63 and 90 are all in the open condition.

If it is intended to connect the inverter to the public power supply system by closing main switches 60 and 63, prior to that, switch 90 is closed to connect the ohmic resistance 80 in parallel to the output 61,62 of the inverter circuit.

Switches 50,51 are opened and closed at high frequency to invert the DC input voltage into an AC output voltage. In this condition, the symmetry of the DC-link UDC+ and UDC− is measured and the duty ratio of switches 50,51 is selectively altered by a controller to adjust the symmetry. Physically, selected amounts of the current flow through the ohmic resistance 80 and thus the symmetry of the DC-link is adjusted.

After the symmetry has been adjusted, the voltage across capacitor 71 can be synchronized to the voltage in the public power supply system in order to minimize the compensatory current when connecting the inverter to the public power supply system.

After adjusting symmetry and synchronizing frequency and phase of the output voltage to the mains voltage main switches 60 63 are closed to connect the inverter circuit and thus the photovoltaic cells 10 to the public power supply system. Thereafter, switch 90 can be opened and switches 50 and 51 can be changed to regular inverter mode. By this, the inverted, adjusted and synchronized voltage of the photovoltaic system is provided to the public power supply system.

The invention claimed is:

1. Power inverter circuit that produces an AC voltage at an inverter output and that adjusts a symmetry of the AC voltage before coupling the inverter output to a load, the symmetry being the amount of positive voltage in the AC voltage in relation to the amount of negative voltage in the AC voltage, the power inverter circuit comprising:
    first switching means (50) for selectively connecting a positive AC voltage to the inverter output (61),
    second switching means (51) for selectively connecting a negative AC voltage to the inverter output,
    ohmic resistance means (80) coupled in parallel to the inverter output via third switching means (90), wherein that the ohmic resistance means functions as a substitute for the load of the power inverter during times when the power inverter output is disconnected from the load to allow the symmetry of the AC voltage output from the power inverter to be matched to the AC voltage of the load using the ohmic resistance means before coupling the power inverter output to the load,
    fourth switching means (60,63) arranged between the ohmic resistance means and the inverter output for selectively coupling the inverter output to the load,
    a controller for selectively switching the first and second switching means with a switching frequency and with respective amounts of on-time to produce an AC voltage from the positive and negative voltage,
    wherein the controller is adapted to adjust the symmetry of the AC voltage produced by the inverter by altering the respective amounts of on-time of the first and second switching means.

2. Inverter circuit according to claim 1,
    wherein the ratio of the on-time of the first switch means to the sum of the on-times of the first and second switch means is a duty ratio, and wherein the controller alters the duty ratio.

3. Inverter circuit according to claim 2,
    characterized in that the controller is adapted to alter the duty ratio to synchronize the AC voltage produced by the inverter to an AC voltage provided in a load to which the inverter output is to be connected.

4. Inverter circuit according claim 1,
    characterized in that the first and second switching means are adapted to be switched at frequencies of more than 1 kHz.

5. Inverter circuit according to claim 1, wherein the first and second switching means are switched at frequencies of more than 15 kHz.

6. Inverter circuit according to claim 1,
    characterized by inductive-capacitive filtering means (70, 71) coupled between inverting means and the inverter output.

7. Inverter circuit according to claim 6,
    characterized in that the inductive-capacitive filtering means comprise capacitive resistance means (71) coupled in parallel to the ohmic resistance means.

8. Inverter circuit according to claim 6,
    characterized in that the inductive-capacitive filtering means comprise inductive reactance means connected in series to the ohmic resistance means.

9. Inverter circuit according to claim 1,
    further comprising a chopper controller coupled in parallel to the input of the inverter circuit.

10. A method of operating a power inverter circuit, the power inverter circuit producing an AC voltage at an inverter output, the method adjusting a symmetry of the AC voltage before coupling the inverter output to a load, the symmetry being the amount of positive voltage in the AC voltage in relation to the amount of negative voltage in the AC voltage, the method comprising:
    coupling ohmic resistance means (80) in parallel with the inverter output (61, 62) as a substitute for the load of the power inverter during times when the power inverter output is disconnected from the load to allow the symmetry of the AC voltage to be matched to the AC voltage of the load using the ohmic resistance means before coupling the power inverter to the load,
    selectively switching first switching means (50) for connecting a positive AC voltage to the inverter circuit output, the first switching means having a respective amount of on-time,
    selectively switching second switching means (51) for connecting a negative AC voltage to the inverter output, the second switching means having a respective amount of on-time,
    adjusting the symmetry of the output voltage by selectively altering the respective amounts of on-time of the first and second switching means, and
    thereafter decoupling the ohmic resistance means from the inverter output.

11. Method according to claim 10, further comprising:
    after adjusting the symmetric of the output voltage, coupling the inverter output to a load.

12. Method according to claim 10, further comprising, after adjusting the symmetric of the output voltage and before decoupling the ohmic resistance means from the inverter output, coupling the inverter output to a load.

13. Method according to claim 10,
    characterized in that the inverted AC voltage is filtered using inductive-capacitive filtering means (70, 71) coupled between inverting means and the inverter output.

14. Method according to claim 10,
    characterized in that the duty ratio of switching the first and second switching means (50, 51) is selectively altered for synchronizing the symmetry of the output voltage to a voltage in a public main system before coupling the inverter output to the load.

* * * * *